United States Patent [19]
Doi et al.

[11] 4,164,752
[45] Aug. 14, 1979

[54] OPTICAL SYSTEM FOR COLOR TELEVISION CAMERAS

[75] Inventors: Yoshikazu Doi; Katsuo Katagiri; Kazuo Yoshikawa, all of Omiya, Japan

[73] Assignee: Fuji Photo Optical Co., Ltd., Omiya, Japan

[21] Appl. No.: 859,747

[22] Filed: Dec. 12, 1977

[30] Foreign Application Priority Data

Dec. 15, 1976 [JP] Japan .................................. 51-150552

[51] Int. Cl.$^2$ ............................................. H04N 9/04
[52] U.S. Cl. ...................................................... 358/55
[58] Field of Search ................ 358/55, 50; 356/106 R

[56] References Cited

U.S. PATENT DOCUMENTS 3,162,713  12/1964  Koester et al. .................. 356/106 R
4,058,827  11/1977  Ando et al. ............................ 358/55

*Primary Examiner*—Richard Murray
*Attorney, Agent, or Firm*—Thomas R. Morrison

[57] ABSTRACT

An optical system for a color television camera includes an interchangeable taking lens, a color separating prism block located behind the taking lens and three image pick-up tubes for different color images located behind the prism block. Between the prism block and at least one of the pick-up tubes an optical element which is capable of varying the optical path length is inserted. The optical path length varying element may be a plane parallel plate or a combination of two optical wedges having parallel opposite end faces. The plane parallel plate changes the optical path length by its thickness. The combination of the two optical wedges varies the optical path length by sliding the wedges with respect to each other to vary the distance between the opposite end faces.

10 Claims, 3 Drawing Figures

OPTICAL SYSTEM FOR COLOR TELEVISION CAMERAS

BACKGROUND OF THE INVENTION

1. Field of the Invention

This invention relates to an optical system for a color television camera, and more particularly to an optical system for a color television camera provided with an interchangeable taking lens.

2. Description of the Prior Art

In a color television camera, a color separating prism block is located behind a taking lens system and three image pick-up tubes are located behind the color separating prism block for three colors, i.e. red, green and blue. The axial position of the three image pick-up tubes is controlled to always obtain sharp images on their image receiving face. In order to finely control the axial position of the image pick-up tubes, there have been employed tracking means in each tube in the conventional color television cameras.

The positions of the focal planes of the three different color images are different from each other due to the chromatic aberration. In other words, the focal planes of the three different color images are not optically conjugate with each other because of the difference in refractive indices for different wavelengths. Further, the difference in position of the focal planes is proportional to the focal length of the taking lens system. Therefore, even if the positions of the three image pick-up tubes are once axially determined to obtain sharp images on all the tubes for one taking lens of a focal length, the position must be readjusted when the taking lens is changed to one of a different focal length.

Therefore, in case of a television camera in which the taking lens is interchangeable, the axial position of the image pick-up tubes must be readjusted every time the taking lens is changed. However, it is very difficult and requires a complicated costly means to smoothly and accurately adjust the axial position of the image pick-up tubes.

SUMMARY OF THE INVENTION

In view of the above described drawbacks inherent in the optical system of the conventional television cameras, it is the primary object of the present invention to provide an optical system for color television cameras in which the compensation for the difference in chromatic aberration is easily conducted without axially moving the image pick-up tubes.

The optical system for color television cameras in accordance with this invention is characterized in that a plane parallel plate is inserted into some of the three different color optical paths. In more detail, in front of one or more image pick-up tubes are provided plane parallel plates to compensate for the difference in chromatic aberration. The plane parallel plate may be replaced by a combination of optical wedges.

DESCRIPTION OF THE PREFERRED EMBODIMENTS

Figure 1:
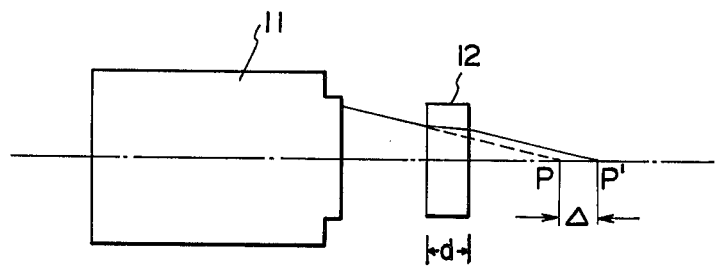
FIG. 1 shows the principle employed in the present invention.

FIG. 1 shows the principle employed by the present invention. In the optical system in accordance with the present invention, a plane parallel plate 12 is inserted behind a taking lens 11 to displace the position P of the actual focal plane to the desired position P'. The desired position P' is the position of the image receiving face of the image pick-up tube in the color television camera. The amount of the displacement $\Delta$ of the focal plane from the position P to P' is determined by the refractive index N and the thickness d of the plane parallel plate, which is represented by the following formula.

$$\Delta = d(1-[1/N])$$

From the practical viewpoint, it is more preferable to change the thickness d than to change the refractive index N to obtain various degrees of displacement for the purpose of compensation or adjustment.

Figure 2:
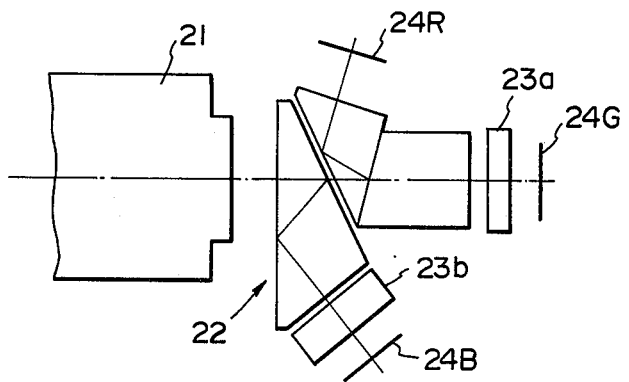
FIG. 2 is a longitudinal view showing an embodiment of the present invention.

FIG. 2 shows an embodiment of the optical system in accordance with the present invention. In this embodiment, plane parallel plates 23a and 23b of different thicknesses are inserted into the green and blue optical paths respectively while no plate is inserted into the red optical path. The reference characters 24R, 24G and 24B designate the image receiving faces of the image pick-up tubes for the three different colors, i.e. red, green and blue, respectively. The reference numeral 22 shows a color separating prism block, and 21 shows a taking lens. The thickness of the plane parallel plates 23a and 23b is selected to obtain the focal planes of the green and blue images accurately on the image receiving faces 24G and 24B of the image pick-up tubes. The plane parallel plates 23a and 23b are changeable to those of different thicknesses to accomplish the compensation for the taking lenses of various different focal lengths. In practical use, it is desirable to mount a plurality of plane parallel plates of different thicknesses on a turret so that a proper plate may selectively be put into alignment with the optical axis of the divided different color paths by simply rotating the turret.

Figure 3:
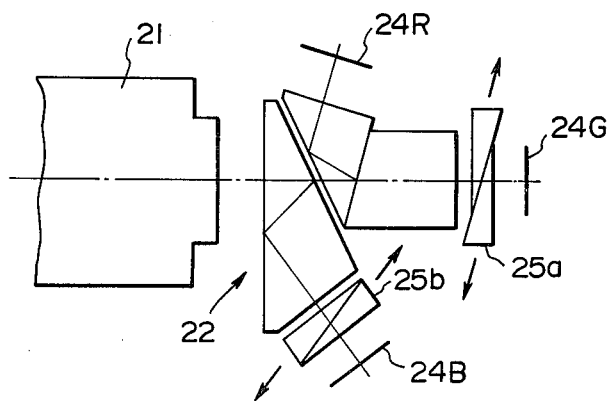
FIG. 3 is a longitudinal view showing another embodiment of the present invention.

FIG. 3 shows another embodiment of the present invention. In this embodiment, a combination of optical wedges 25a is substituted for the plane parallel plate 23a of the first embodiment. Another combination of optical wedges 25b is used in place of the plane parallel plate 23b. Other elements shown in FIG. 3 equivalent to those shown in FIG. 2 are designated with the same reference numerals. The combination of the optical wedges is capable of varying the composite thickness thereof by simply sliding the wedge elements with respect to each other in the direction along the face of the wedges at which the wedges are in contact with each other. In accordance with this embodiment the thickness of the wedge combination substituting for the plane parallel plate can be continuously controlled. In use, the thickness of the wedge combinations 25a and 25b is properly adjusted to obtain sharp images accurately on the image receiving faces of the image pick-up tubes.

In the above two embodiments, the plane parallel plates 23a and 23b and the optical wedge combinations 25a and 25b are inserted in the green and blue optical paths. It should be noted, however, that the optical path or paths in which the plane parallel plate or plates should be inserted is not limited but may be properly determined.

We claim:

1. An optical system for a color television camera provided with an interchangeable taking lens including a taking lens having an optical axis, a color separating prism block located behind the taking lens, said color separating prism block having an entrance optical axis coinciding with the optical axis of the taking lens and three different color exit optical axes, and three image pick-up tubes located behind the color separating prism block on said three different color exit optical axes respectively, wherein the improvement comprises optical path length varying means selectively inserted in said three different color exit optical axes behind said color separating prism block, whereby color images formed in the three different color exit optical axes are all sharply focused on said three image pick-up tubes respectively.

2. An optical system for a color television camera as defined in claim 1 wherein said optical path length varying means comprises a plurality of plane parallel plates.

3. An optical system for a color television camera as defined in claim 2 wherein said plane parallel plates have different thicknesses and are selectively put into at most two of said three different color exit optical axes.

4. An optical system for a color television camera as defined in claim 2 wherein said plane parallel plates have different refractive indices.

5. An optical system for a color television camera as defined in claim 1 wherein said optical path length varying means comprises a plurality of combinations of optical wedges having parallel external planes.

6. An optical system for a color television camera as defined in claim 5 wherein said combination of optical wedges are slidably combined together to have parallel external planes the distance between which is varied by sliding the wedges with respect to each other.

7. In an optical system for a color television camera provided with an interchangeable taking lens including a taking lens having an optical axis, a color separating prism block located behind the taking lens, said color separating prism block having an entrance optical axis coinciding with the optical axis of the taking lens and three different color exit optical axes, and three image pick-up tubes located behind the color separating prism block on said three different color exit optical axes respectively, wherein the improvement comprises optical path length varying means selectively inserted in at least one of said three different color exit optical axes behind said color separating prism block, whereby color images formed in said at least one exit optical axis is sharply focused on its respective image pick-up tube.

8. In a color-separation optical system of the type which color separates the scene into a plurality of images in respective image planes, the improvement comprising refractive means for varying the optical path length to at least one of said image planes, said refractive means being selectively insertable in the optical path to said at least one image plane immediately in front of said image plane.

9. Apparatus recited in claim 8 further comprising said refractive means being a pair of facing transparent wedges in the optical path, the distal faces of said wedges being planes disposed normal to the optical path, and the combined thickness of said pair of wedges along said optical path being continuously variable by displacing said pair of wedges in opposite directions normal to the optical path.

10. Apparatus recited in claim 8 further comprising:
(a) said image planes being the three image planes of a television camera; and
(b) refractive means for independently varying the optical path length to at least a second of said three image planes.